United States Patent
Hamada

(10) Patent No.: US 8,267,569 B2
(45) Date of Patent: Sep. 18, 2012

(54) BACKLIGHT DEVICE AND FLAT DISPLAY DEVICE USING SAME

(75) Inventor: Tetsuya Hamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 92 days.

(21) Appl. No.: 12/997,613

(22) PCT Filed: Apr. 10, 2009

(86) PCT No.: PCT/JP2009/057328
§ 371 (c)(1),
(2), (4) Date: Dec. 13, 2010

(87) PCT Pub. No.: WO2010/004794
PCT Pub. Date: Jan. 14, 2010

(65) Prior Publication Data
US 2011/0096569 A1 Apr. 28, 2011

(30) Foreign Application Priority Data
Jul. 10, 2008 (JP) ................................ 2008-180414

(51) Int. Cl.
*F21V 29/00* (2006.01)
(52) U.S. Cl. ..................... 362/633; 362/631; 362/612
(58) Field of Classification Search .................. 362/633, 362/634, 632, 612, 613, 611, 631
See application file for complete search history.

(56) References Cited

U.S. PATENT DOCUMENTS

| 2007/0103908 A1 | 5/2007 | Tabito et al. |
| 2007/0133222 A1 | 6/2007 | Watanabe et al. |
| 2007/0165421 A1* | 7/2007 | Sakai et al. .................. 362/612 |
| 2007/0165425 A1 | 7/2007 | Sakamoto et al. |
| 2007/0171676 A1* | 7/2007 | Chang ........................ 362/613 |
| 2010/0073959 A1* | 3/2010 | Hamada ...................... 362/611 |

FOREIGN PATENT DOCUMENTS

| JP | 03-8099 Y2 | 7/1928 |
| JP | 2000-304014 A | 10/2000 |
| JP | 2006-049098 A | 2/2006 |
| JP | 2007-012416 A | 1/2007 |
| JP | 2007-059216 A | 3/2007 |
| JP | 2007-163620 A | 6/2007 |
| JP | 2007-194067 A | 8/2007 |

OTHER PUBLICATIONS

Official Communication issued in International Patent Application No. PCT/JP2009/057328, mailed on Jul. 14, 2009.

* cited by examiner

Primary Examiner — Laura Tso
(74) Attorney, Agent, or Firm — Keating & Bennett, LLP

(57) ABSTRACT

A backlight device (3) includes: a light guide plate (32); a chassis (31) on which the light guide plate (32) is mounted; a frame member (35) having the light guide plate (32) held between the chassis (31) and the frame member (35); a spot light source (36) arranged near a side surface of the light guide plate (32); a flexible printed circuit board (37) on which the spot light source (36) is mounted; and a heat dissipation plate (31a) (part of the chassis (31)) bonded through a double-faced adhesive (38) to the flexible printed circuit board (37). The frame member (35) is provided with a protrusion portion (351) that is in contact with the flexible printed circuit board (37) and that presses the flexible printed circuit board (37) onto the heat dissipation plate (31a), and a tip portion of the protrusion portion (351) is so tapered as to be located apart from the flexible printed circuit board (37).

12 Claims, 3 Drawing Sheets

BACKLIGHT DEVICE AND FLAT DISPLAY DEVICE USING SAME

TECHNICAL FIELD

The present invention relates to a backlight device that is used to illuminate a display panel from its back surface, and more particularly relates to a side-lit backlight device using a spot light source. The present invention also relates to a flat display device using such a backlight device.

BACKGROUND ART

In a display device, such as a liquid crystal display device, whose display panel itself does not emit light, a so-called backlight device illuminating the display panel from its back surface is generally arranged. Examples of the backlight device include a direct-lit backlight device, a side-lit backlight device and a planar light source backlight device; as display devices become thinner and lighter, the side-lit backlight devices are widely employed.

In the side-lit backlight device, its light source is arranged near the side surface of a light guide plate, and light emitted from the light source enters the light guide plate from the side surface. The light that has entered the light guide plate is emitted from its main surface as planar shaped light, and illuminates a display panel from the side of its back surface. Since there has been growing environmental awareness in recent years, instead of a cold cathode tube functioning as a linear light source, light emitting diodes (LED) functioning as a spot light source are increasingly used as the light source of the side-lit backlight device. FIG. 7 is a schematic diagram showing the attachment structure of a spot light source in a conventional side-lit backlight device using the spot light source.

As shown in FIG. 7, in the conventional backlight device 100, LEDs 101 mounted on a flexible printed circuit board (FPC) 102 are attached to a side surface portion 103a of a lower chassis 103. The lower chassis 103 functions to accommodate a reflective sheet 104, a light guide plate 105 and optical sheets 106. Since the lower chassis 103 is formed of a high thermal conductivity material, it also functions as a heat dissipation plate. The reflective sheet 104, the light guide plate 105 and the optical sheets 106 accommodated in the lower chassis 103 are held between the lower chassis 103 and an upper chassis 107.

As shown in FIG. 7, the FPC 102 is generally attached to the side surface portion 103a of the lower chassis using a double-faced adhesive (double-faced tape) 108. However, in a method of using the double-faced adhesive 108, especially when it is used under a high temperature environment for a long period of time, the FPC 102 is likely to curl up as shown in FIG. 8. FIG. 8 is a diagram illustrating a problem encountered by the conventional side-lit backlight device 100.

One reason why the FPC 102 curls up is the life of the double-faced adhesive 108; another reason given is an operation failure that occurs at the time of assembly. Specifically, the operation failure at the time of assembly may cause bubbles between the FPC 102 and the side surface portion 103a of the lower chassis or may cause foreign matter contamination. When this type of operation failure occurs, the adhesiveness of the double-faced adhesive 108 is reduced, and the FPC 102 is more likely to curl up.

One way to reduce the curling up of the FPC 102 as described above is to increase the accuracy of the operation of assembling the backlight device 100. However, the method of enhancing the operation accuracy and thereby reducing the occurrence of bubbles and the foreign matter contamination may increase the cost of producing the backlight device 100.

Conventionally, as disclosed in patent document 1, a circuit board on which LEDs are mounted is fixed to a heat dissipation plate with a screw. For this reason, this method is applied to the backlight device 100, and thus it is possible to fix the FPC 102 to the side surface portion 103a of the lower chassis (heat dissipation plate) with a screw. However, in this case, since the FPC 102 is flexible, the circuit board is warped under a high temperature environment, and thus a contact area between the FPC 102 and the heat dissipation plate 103a may be reduced. The reduction of the contact area between the FPC 102 and the heat dissipation plate 103a makes it impossible to sufficiently diffuse heat emitted from the LEDs 101, and it is therefore likely to reduce the light emission efficiency and the life of the LEDs 101.

RELATED ART DOCUMENT

Patent Document

Patent document 1: JP-A-2006-49098

DISCLOSURE OF THE INVENTION

Problems to be Solved by the Invention

In view of the foregoing problems, an object of the present invention is to provide a backlight device that achieves a long life with a structure where a circuit board having a spot light source mounted thereon is unlikely to be detached from a heat dissipation plate and that is also easily assembled. Another object of the present invention is to use such a backlight device and thereby provide a flat display device that stably obtains a high image display quality.

Means for Solving the Problem

To achieve the above object, a backlight device according to the present invention includes: a light guide plate; a chassis on which the light guide plate is mounted; a frame member having the light guide plate held between the chassis and the frame member; a spot light source arranged near a side surface of the light guide plate; a flexible printed circuit board on which the spot light source is mounted; and a heat dissipation plate bonded through a double-faced adhesive to the flexible printed circuit board. In the backlight device, the frame member is provided with a protrusion portion that is in contact with the flexible printed circuit board and that presses the flexible printed circuit board onto the heat dissipation plate, and a tip portion of the protrusion portion is so tapered as to be located apart from the flexible printed circuit board.

With this configuration, the protrusion portion provided in the frame member presses the flexible printed circuit board onto the heat dissipation plate. Hence, both the adhesion of the double-faced adhesive and the pressing force of the protrusion portions fix the flexible printed circuit board to the heat dissipation plate, and thus the flexible printed circuit board is unlikely to curl up. It is therefore possible to achieve a long life of the backlight device as compared with the conventional backlight device. In the backlight device of this configuration, the tip portion of the protrusion portion provided in the frame member is so tapered as to be located apart from the flexible printed circuit board. Since the tip portion of the protrusion portion is formed as described above, when the frame member is attached, the protrusion portion is unlikely to be caught on the flexible printed circuit board. Thus, it is possible to smoothly attach the frame member. It is also possible to reduce the possibility of the flexible printed circuit board being scratched during the operation.

In the backlight device configured as described above, the tip portion of the protrusion portion may be rounded such that the tip portion of the protrusion portion is tapered or an inclined surface may be formed in the tip portion of the protrusion portion such that the tip portion of the protrusion portion is tapered. The protrusion portion configured as described above can be formed integrally with the frame member, and is easily provided.

In the backlight device configured as described above, a plurality of spot light sources may be included, and the spot light sources may be so mounted as to be arranged in a line on the flexible printed circuit board, and a plurality of protrusion portions may be so provided as to be arranged in gaps formed between the spot light sources. In this configuration, when a cathode electrode and an anode electrode included in the spot light source are arranged opposite each other with a light emission portion interposed therebetween, the spot light sources are preferably mounted on the flexible printed circuit board such that a direction in which the cathode electrode and the anode electrode face each other is substantially perpendicular to a direction in which the spot light sources are arranged. With this configuration, it is possible to set wider the width of each protrusion portion arranged between the spot light sources. Thus, with the protrusion portions, it is possible to reliably press the flexible printed circuit board.

In the backlight device configured as described above, the flexible printed circuit board may be bonded by the double-faced adhesive to the chassis, and the chassis may also function as the heat discharge plate. Thus, it is possible to reduce the number of components and improve the assembly.

To achieve the above object, a flat display device according to the present invention includes: a liquid crystal panel; and a backlight device attached to the side of the back surface of the liquid crystal panel. In the flat display device, as the above-mentioned backlight device, the backlight device configured as described above is used.

With this configuration, since the life of the backlight device used in the flat display device is extended, it is possible to stably obtain a high image display quality.

Advantages of the Invention

According to one aspect of the present invention, there is provided a backlight device that achieves a long life with a structure where a circuit board having a spot light source mounted thereon is unlikely to be detached from a heat dissipation plate and that is also easily assembled. According to another aspect of the present invention, there is provided a flat display device that stably obtains a high image display quality.

BEST MODE FOR CARRYING OUT THE INVENTION

An embodiment of a backlight device according to the present invention and a flat display device using such a backlight device will be described below with reference to the accompanying drawings. As an example of the flat display device, a liquid crystal display device in which liquid crystal is used in a display panel will be described below.

Figure 1:
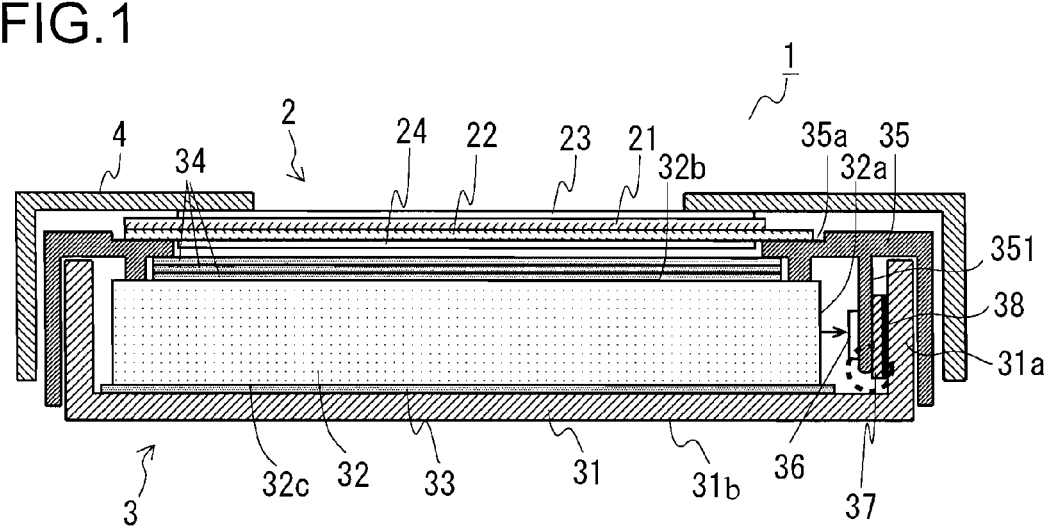
FIG. 1 A schematic cross-sectional view showing the configuration of a liquid crystal display device of the present embodiment.

FIG. 1 is a schematic cross-sectional view showing the configuration of the liquid crystal display device of the present embodiment. The liquid crystal display device 1 of the present embodiment includes a liquid crystal panel 2 and a backlight device 3.

The liquid crystal panel 2 is formed by sealing in liquid crystal (not shown) between a pair of glass substrates 21 and 22 that are located apart from and opposite each other. The perimeter of the glass substrate 22 extends outward more than the glass substrate 21; a large number of electrode terminals (not shown) for applying voltage to pixel electrodes formed on the surface of the glass substrate 22 are formed on the extended portion. Polarizing plates 23 and 24 are attached to the upper and lower surfaces of the liquid crystal panel 2, respectively.

The backlight device 3 includes a lower chassis 31, a light guide plate 32, a reflective sheet 33, optical sheets 34, an upper chassis 35, light emitting diodes (LED) 36 and a flexible printed circuit board (FPC) 37.

The lower chassis 31 is box-shaped and accommodates the light guide plate 32, the reflective sheet 33 and the optical sheets 34. The lower chassis 31 is formed of a high thermal conductivity material (for example, metal), and thus heat generated by the LEDs 36 attached to a side surface portion 31a is easily dissipated. In other words, the lower chassis 31 of the present embodiment also functions as a heat dissipation plate.

The configuration of the lower chassis 31 is not limited to the configuration of the present embodiment; for example, the lower chassis 31 may be composed of two members that are a frame member and a back sheet metal attached to block an opening in the bottom surface of the frame member.

The light guide plate 32 is formed of, for example, acryl resin, and is formed substantially in the shape of a rectangular parallelepiped. On the side of the lower surface 32c of the light guide plate 32, the reflective sheet 33 is provided such that part of light traveling through the light guide plate 32 can be reflected. Thus, the light that has entered the light guide plate 32 through its side surface 32a emanates from its upper surface 32b as planar shaped light. On the side of the upper surface 32b of the light guide plate 32, three optical sheets 34 are arranged. The optical sheets 34 are provided to achieve, for example, uniformity and evenness of the light emitted from the light guide plate 32; the number of sheets is not limited to that of the present embodiment.

The upper chassis 35 is formed of, for example, resin, and is placed over the lower chassis 31. The light guide plate 32, the reflective sheet 33 and the optical sheets 34 are held between the upper chassis 35 and the lower chassis 31. In the upper chassis 35, an opening portion is formed through which the light emitted from the light guide plate 32 passes; the upper chassis 35 is a frame member that is formed in the shape of a frame. A step portion 35a is formed around the perimeter of the opening portion of the upper chassis 35; the perimeter of the liquid crystal panel 2 can be placed thereon.

In the upper chassis 35, protrusion portions 351 are formed that protrude downward (in a direction toward the lower chassis 31 and substantially perpendicular to the bottom surface 31b of the lower chassis 31) on the side where the LEDs 36 are arranged and that are in contact with the FPC 37. The protrusion portions 351 will be described in detail later.

A plurality of LEDs 36 are arranged near the side surface 32a of the light guide plate 32. Light emitted by the LEDs 36 enters the light guide plate 32 through the side surface 32a of the light guide plate 32. The LEDs 36 are an example of a spot light source. The LEDs 36 are spaced a predetermined distance away from each other in a line along a direction perpendicular to the plane of FIG. 1. Specifically, the LEDs 36 are mounted on the FPC 37; the FPC 37 is attached to the side surface portion 31a of the lower chassis 31 and thus the LEDs 36 are arranged near the side surface 32a of the light guide plate 32. The FPC 37 and the side surface portion 31a of the lower chassis 31 are bonded together through a double-faced adhesive 38.

The liquid crystal display device 1 is formed by placing the perimeter portion of the liquid crystal panel 2 onto the step portion 35a of the upper chassis 35 in the backlight device 3 and placing a bezel 4 over the liquid crystal panel 2. The configuration of the liquid crystal display device 1 has been schematically described above. The backlight device 3 of the liquid crystal display device 1 of the present embodiment is structured such that the FPC 37 is unlikely to be detached from the side surface portion 31a (functioning as a heat dissipation plate) of the lower chassis 31. This point will be described below mainly with reference to FIGS. 2, 3 and 4.

Figure 2:
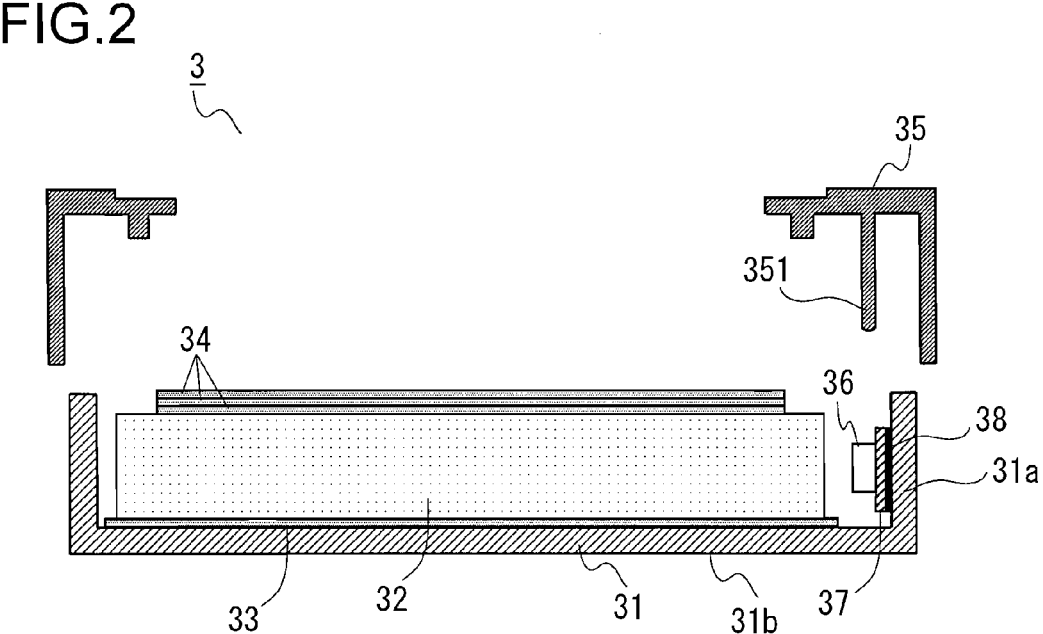
FIG. 2 A cross-sectional view showing the configuration of a backlight device of the present embodiment and a state before the attachment of an upper chassis.
Figure 3:
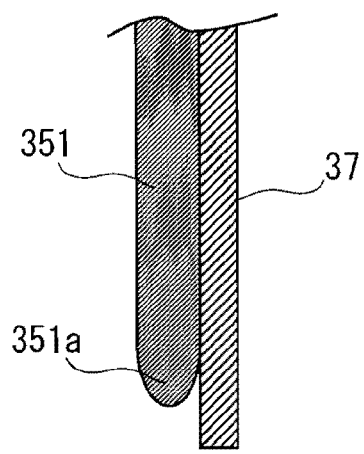
FIG. 3 An enlarged view showing a portion enclosed by a broken line circle of FIG. 1.
Figure 4:
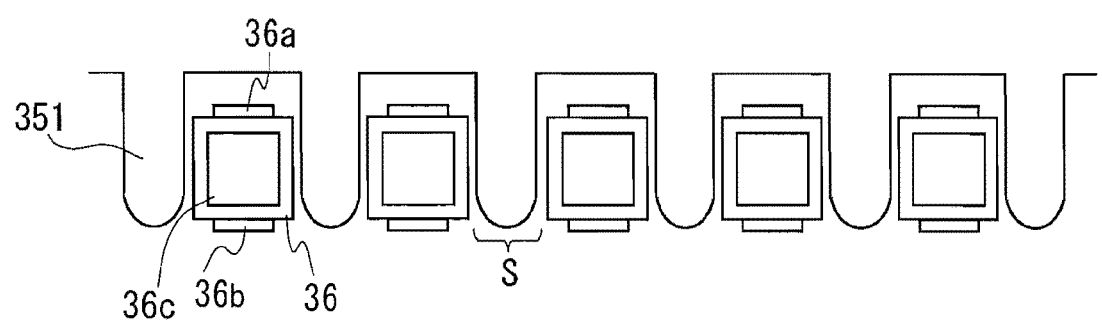
FIG. 4 A schematic plan view showing the relationship between LEDs and protrusion portions provided in the upper chassis when the LEDs and the protrusion portions are seen in a direction indicated by an arrow shown in FIG. 1.

FIG. 2 is a cross-sectional view showing the configuration of the backlight device 3 and a state before the attachment of the upper chassis 35. FIG. 3 is an enlarged view of a portion enclosed by a broken line circle of FIG. 1. FIG. 4 is a schematic plan view showing the relationship between the LEDs 36 and the protrusion portions 351 provided in the upper chassis 35 when the LEDs 36 and the protrusion portions 351 are seen in a direction indicated by an arrow shown in FIG. 1.

As described above, in the upper chassis 35, the protrusion portions 351 protruding downward are formed (see FIG. 2). A plurality of protrusion portions 351 are spaced a predetermined distance away from each other in a direction perpendicular to the plane of FIG. 2. With the upper chassis 35 placed over the lower chassis 31, the protrusion portions 351 are in contact with the FPC 37 attached to the side surface portion 31a of the lower chassis 31, and thereby press the FPC 37 onto the side surface portion 31a of the lower chassis 31. In order not to make contact with the LEDs 36 when the upper chassis 35 is placed over the lower chassis 31, the protrusion portions 351 are arranged in gaps S formed between the LEDs 36 (see FIG. 4).

In the present embodiment, as shown in FIG. 3, the tip portion 351a of the protrusion portion 351 is rounded, and, with the upper chassis 35 placed over the lower chassis 31, the tip portion 351a is located apart from the FPC 37 (the tip portion 351a is not in contact with the FPC 37). When the tip portion 351a of the protrusion portion 351 is rounded as described above, the upper chassis 35 is easily placed over the lower chassis 31.

Specifically, since the tip portion 351a of the protrusion portion 351 is rounded, even if the protrusion portion 351 makes contact with the FPC 37 when the upper chassis is placed over the lower chassis 31, the tip portion 351a is unlikely to be caught on the FPC 37. Hence, when the upper chassis 35 is attached, it is possible to reduce the possibility of the FPC 37 being scratched and smoothly attach the upper chassis 35.

In the present embodiment, as shown in FIG. 4, even when the protrusion portions 351 are seen in the direction indicated by the arrow of FIG. 1, the tip portions are rounded. Here, it should be noted that FIG. 3 is a cross-sectional view and the protrusion portions 351 are seen in a direction displaced by 90 degrees with respect to FIG. 4. The protrusion portions 351 are formed in this way, and thus it is preferably possible to reduce the possibility of the protrusion portions 351 being caught on the LEDs 36 when the upper chassis 35 is placed over the lower chassis 31. The present invention is not limited to this shape; for example, when the protrusion portions 351 are seen in the direction indicated by the arrow of FIG. 1, the protrusion portions 351 may be substantially rectangular. The shape of the protrusion portion 351 can be changed as necessary.

As shown in FIG. 4, the LEDs 36 of the present embodiment are configured such that cathode electrodes 36a and anode electrodes 36b are arranged opposite each other with light emission portions 36c interposed therebetween. The LEDs 36 are mounted on the FPC 37 such that the direction (substantially coincides with the vertical direction of FIG. 4) in which the cathode electrodes 36a and the anode electrodes 36b face each other is substantially perpendicular to the direction (substantially coincides with the lateral direction of FIG. 4) in which the LEDs 36 are aligned. This reason will also be described with reference to FIG. 5.

Figure 5:
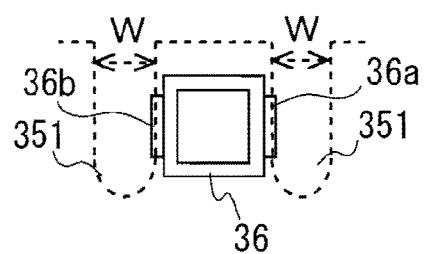
FIG. 5 A diagram illustrating a disadvantage encountered when the LEDs are mounted in a direction different from that of the present embodiment.

FIG. 5 is a diagram illustrating a disadvantage encountered when the LEDs 36 are mounted in a direction different from that of the present embodiment. When, as shown in FIG. 5, the direction in which the cathode electrode 36a and the anode electrode 36b face each other is substantially parallel to the direction in which the LEDs 36 are aligned, and the width of the protrusion portion 351 is assumed to be the same as in the present embodiment, the protrusion portions 351 make contact with the LEDs 36. Hence, since it is necessary to reduce the width of the protrusion portion 351, an area where the protrusion portions 351 press the FPC 37 is reduced. On the other hand, with the configuration of the present embodiment, it is possible to increase as much as possible the area where the protrusion portions 351 press the FPC 37. Therefore, the present embodiment is preferable because the effect of the protrusion portions 351 pressing the FPC 37 is increased.

Even when the LEDs 36 are mounted on the FPC 37 in the direction indicated in FIG. 5, the effect of the protrusion portions 351 pressing the FPC 37 is obtained. Hence, the configuration in which the LEDs 36 are mounted as shown in FIG. 5 is naturally covered by the scope of the present invention.

As described above, in the backlight device 3 of the present embodiment, the protrusion portions 351 provided in the upper chassis 35 press the FPC 37 onto the side surface portion 31a (heat dissipation plate) of the lower chassis 31. Hence, in the backlight device 3 of the present embodiment, both the adhesion of the double-faced adhesive 38 and the pressing force of the protrusion portions 351 fix the FPC 37 to the side surface portion 31a of the lower chassis 31, with the result that the FPC 37 is unlikely to curl up. Therefore, with the backlight device 3 of the present embodiment, it is possible to achieve a long life of the device.

The protrusion portion 351 for achieving a long life is rounded at its tip portion 351a; with the upper chassis 35 placed over the lower chassis 31, the tip portion 351a is located apart from the FPC 37. Since the protrusion portions 351 are shaped as described above, even when the upper chassis 35 is attached (placed) and the protrusion portions 351 make contact with the FPC 37, the tip portions 351a are unlikely to be caught on the FPC 37. Thus, it is possible to smoothly attach the upper chassis 35.

Needles to say, the present invention is not limited to the embodiment described above. In other words, many modifications are possible without departing from the scope of the present invention.

For example, in the embodiment described above, in the backlight device 3, the tip portion 351a of the protrusion portion 351 is rounded, and thus the tip portion 351a is located apart from the FPC 37. However, the present invention is not limited to this configuration. Specifically, the tip portion of the protrusion portion 351 is tapered, and thus the tip portion 351a may be located apart from the FPC 37. With this type of configuration, even when the upper chassis 35 is attached and the protrusion portions 351 make contact with the FPC 37, the tip portions 351a are unlikely to be caught on the FPC 37. Thus, it is possible to smoothly attach the upper chassis 35.

Figure 6:
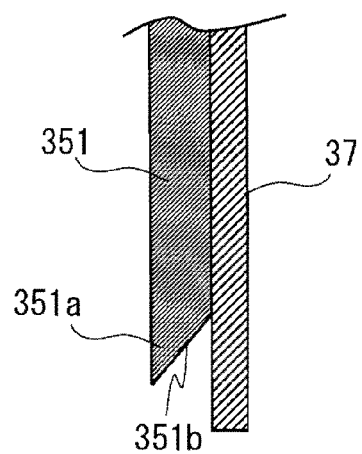
FIG. 6 A diagram illustrating a variation of the backlight device of the present embodiment.
Figure 7:
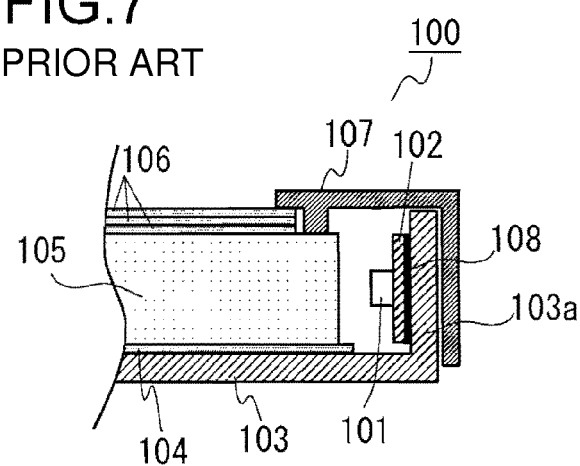
FIG. 7 A schematic diagram showing the attachment structure of a spot light source in a conventional side-lit backlight device using the spot light source.
Figure 8:
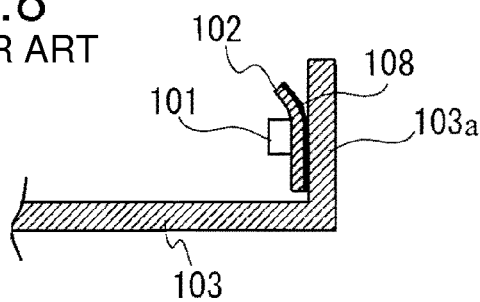
FIG. 8 A diagram illustrating a problem encountered by the conventional side-lit backlight device.

Examples of a configuration different from that of the present embodiment described above include a configuration as shown in FIG. 6. In FIG. 6, the protrusion portion 351 is configured such that an inclined surface 351b is formed in the protrusion portion 351. Even in this case, when the upper chassis 35 is attached and the protrusion portions 351 make contact with the FPC 37, the tip portions 351a are unlikely to be caught on the FPC 37. In this configuration, the inclined surface 351b may be flat or curved.

Although, in the embodiment described above, the protrusion portions 351 are arranged in all gaps S formed between the LEDs 36 (see FIG. 4), the present invention is not limited to this configuration. For example, the protrusion portions 351 are not arranged in all gaps S formed between the LEDs 36; the protrusion portions 351 may be arranged in only some of the gaps S. Since the area where the protrusion portions 351 press the FPC 37 is increased, it is preferable to arrange the protrusion portions 351 in all gaps S formed between the LEDs 36 as in the present embodiment. When there is a space (indicating the side where there is no adjacent LED 36) next to the LED 36 arranged in an end portion, the protrusion portion 351 may be arranged in this space.

The liquid crystal display device has been described above as an example of the flat display device. However, needless to say, the present invention is applicable not only to the liquid crystal display device but also to a flat display device, as a display panel, that uses an electrooptic material other than liquid crystal as an optical switch material.

INDUSTRIAL APPLICABILITY

Since a circuit board on which a spot light source is mounted is unlikely to be detached, a backlight device of the present invention has a long life. When a structure for achieving a long life is designed, an assembly operation is also facilitated. Therefore, the backlight device of the present invention is suitable as a backlight device used in a flat display device such as a liquid crystal display device.

LIST OF REFERENCE SYMBOLS

1 Liquid crystal display device (flat display device)
2 Liquid crystal panel
3 Backlight device
31 Lower chassis (chassis, heat dissipation plate)
32 Light guide plate
35 Upper chassis (frame member)
36 LED (spot light source)
36a Cathode electrode
36b Anode electrode
36c Light emission portion
37 FPC (flexible printed circuit board)
38 Double-faced adhesive
351 Protrusion portion
351a Tip portion of the protrusion portion
351b Inclined surface
S Gap

The invention claimed is:
1. A backlight device comprising:
a light guide plate;
a chassis on which the light guide plate is mounted;
a frame member holding the light guide plate together with the chassis;
a spot light source arranged near a side surface of the light guide plate;
a flexible printed circuit board on which the spot light source is mounted; and
a heat dissipation plate bonded through a double-faced adhesive to the flexible printed circuit board,
wherein the frame member is provided with a protrusion portion that is in contact with the flexible printed circuit board and that presses the flexible printed circuit board onto the heat dissipation plate, and
a tip portion of the protrusion portion is so tapered as to be located apart from the flexible printed circuit board.
2. The backlight device of claim 1,
wherein the tip portion of the protrusion portion is rounded such that the tip portion of the protrusion portion is tapered.
3. The backlight device of claim 1,
wherein an inclined surface is formed in the tip portion of the protrusion portion such that the tip portion of the protrusion portion is tapered.
4. The backlight device of claim 1,
wherein a plurality of the spot light sources are included, and the plurality of the spot light sources are so mounted as to be arranged in a line on the flexible printed circuit board, and
a plurality of the protrusion portions are so provided as to be arranged in gaps formed between the spot light sources.
5. The backlight device of claim 4,
wherein a cathode electrode and an anode electrode included in the spot light source are arranged opposite each other with a light emission portion interposed therebetween, and
the spot light sources are mounted on the flexible printed circuit board such that a direction in which the cathode electrode and the anode electrode face each other is substantially perpendicular to a direction in which the spot light sources are arranged.

6. The backlight device of claim 1,
wherein the flexible printed circuit board is bonded by the double-faced adhesive to the chassis, and the chassis also functions as the heat dissipation plate.

7. A flat display device comprising:
a liquid crystal panel; and
a backlight device attached to a side of a back surface of the liquid crystal panel,
wherein, as said backlight device, the backlight device of claim 1 is used.

8. A flat display device comprising:
a liquid crystal panel; and
a backlight device attached to a side of a back surface of the liquid crystal panel,
wherein, as said backlight device, the backlight device claim 2 is used.

9. A flat display device comprising:
a liquid crystal panel; and
a backlight device attached to a side of a back surface of the liquid crystal panel,
wherein, as said backlight device, the backlight device claim 3 is used.

10. A flat display device comprising:
a liquid crystal panel; and
a backlight device attached to a side of a back surface of the liquid crystal panel,
wherein, as said backlight device, the backlight device claim 4 is used.

11. A flat display device comprising:
a liquid crystal panel; and
a backlight device attached to a side of a back surface of the liquid crystal panel,
wherein, as said backlight device, the backlight device claim 5 is used.

12. A flat display device comprising:
a liquid crystal panel; and
a backlight device attached to a side of a back surface of the liquid crystal panel,
wherein, as said backlight device, the backlight device claim 6 is used.

* * * * *